Sept. 19, 1967   E. H. JOHNSON   3,342,211
DAMPER FOR CONTROLLING THE FLOW OF FLUIDS
Filed Sept. 9, 1963
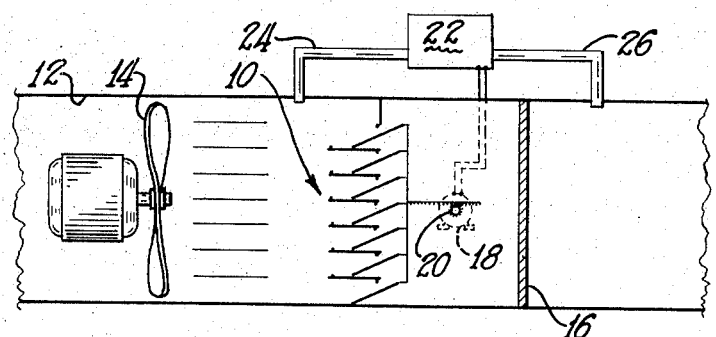
Fig. 1
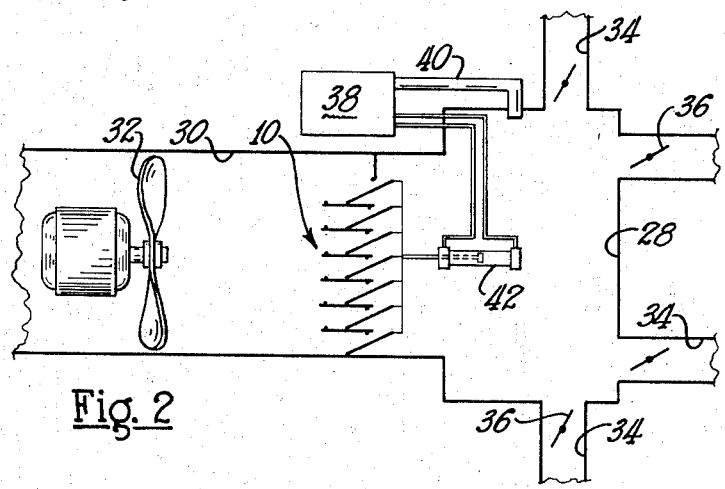
Fig. 2
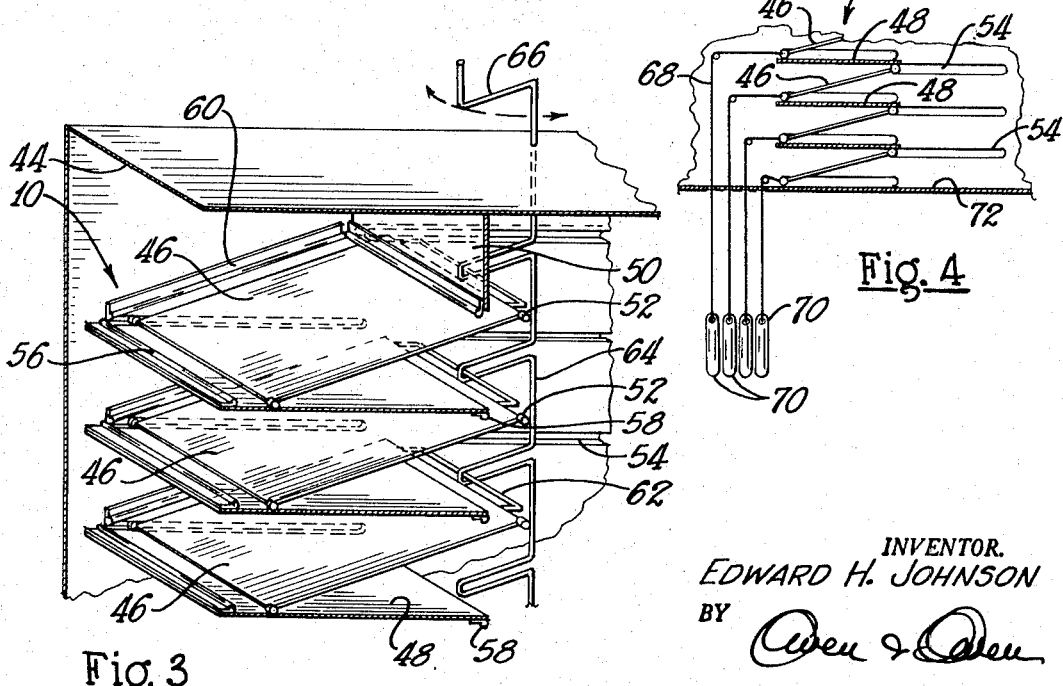
Fig. 3
Fig. 4
INVENTOR.
EDWARD H. JOHNSON
BY
ATTORNEYS

United States Patent Office 3,342,211
Patented Sept. 19, 1967

---

3,342,211
DAMPER FOR CONTROLLING THE FLOW OF FLUIDS
Edward H. Johnson, Maumee, Ohio, assignor to The American Warming & Ventilating, Inc., Toledo, Ohio, a corporation of Ohio
Filed Sept. 9, 1963, Ser. No. 307,419
4 Claims. (Cl. 137—601)

This invention relates to a flow control damper which is capable of controlling fluid flow therethrough more closely than dampers or similar devices heretofore known.

While many dampers are known in the art for regulating the flow of fluid in a passage, such dampers have been incapable of controlling the fluid flow sufficiently accurately for many purposes. In fact, most dampers simply operate on an on-and-off basis. The lack of close fluid control is due primarily to the fact that the blades open excessively fast as they are turned, which prevents close control over the open area resulting as the blades move, and also is due to the fact that when the blades are cracked open, the minimum opening is excessively large to enable close fluid control.

The present invention relates to a flow control damper which is capable of much more accurately regulating flow of fluids therethrough than dampers heretofore known. The new damper arrangement includes a plurality of blades located on an angle with respect to a plurality of vanes associated therewith, with means for providing lineal relative movement between the blades and vanes. With the new arrangement, the movement is greater, and can be much greater than the change in the area of the opening resulting from the movement. In this manner, a relatively large movement of the blades can be effected to result in a relatively small change in the size of the opening, so that the opening size can be closely controlled. The new damper also can be manufactured at low cost because the various components are easily fabricated, being of flat sheet steel not requiring any special curved configurations.

It is, therefore, a principal object of the invention to provide an improved, low cost damper capable of closely controlling flow of fluid therethrough.

Other objects and advantages of the invention will be apparent from the following detailed description of preferred embodiments thereof, reference being made to the accompanying drawing, in which:

FIG. 1 is a schematic view of a damper embodying the invention, shown in a particular application for producing a constant flow of fluid through a filter;

FIG. 2 is a schematic view of a damper embodying the invention, with a slightly different drive arrangement, for maintaining constant pressure of fluid in a plenum chamber;

FIG. 3 is an enlarged, fragmentary view in perspective of a damper embodying the invention and showing a still different drive arrangement; and FIG. 4 is a fragmentary view in vertical cross section of a slightly modified flow control damper.

Referring to the drawing, and more particularly to FIG. 1, a flow control damper embodying the invention is schematically shown and represented by the numeral 10, this damper being located in a duct or passage 12 through which constant flow of fluid is desired. The fluid, such as air, is moved through the passage 12 by means of a fan 14 with the air passing through a filter 16 to remove contaminants. The filter 16 provides increased resistance to the flow of air therethrough as contaminants are collected and the filter becomes dirty or plugged. This is particularly true for finer filters, such as an absolute 5 mesh filter, the pressure drop across which, when the filter is dirty, may be twenty times the pressure drop when the filter is clean. In such an instance, the flow of air also will vary considerably, due to the change in resistance of the filter 16. The flow can be held substantially constant, however, by means of the damper 10 maintaining substantially constant the overall pressure drop across the combination damper 10 and filter 16. This is accomplished by keeping the damper 10 almost closed when the filter 16 is clean and by opening the damper more as the filter becomes dirty and its resistance increases. With the constant pressure drop, the flow of air through the passage 12 thereby remains constant under all conditions.

In this instance, the position of the damper 10 is controlled by means of a motor 18 and a rack and pinion linkage 20 with the operation of the motor controlled by a pressure instrument 22 which measures the pressure drop across the filter 16 and the damper 10 by means of lines 24 and 26.

Referring more particularly to FIG. 2, another installation for the damper 10 includes a plenum chamber 28 in which constant pressure is desired. Fluid such as air is supplied to the plenum chamber 28 through a supply duct 30 by a fan 32. Air is exhausted from the chamber 28 through a plurality of outlet ducts 34, the flow through which can be controlled by suitable valves or damper blades 36. A constant pressure is desired in the chamber 28 so that flow through the ducts 34 can be effectively controlled by the valves or blades 36. Ordinarily, the pressure would drop as more air is removed from the chamber and the pressure would increase as the outward flow of air is restricted. Constant pressure is maintained, however, by regulation of the damper 10 through a pressure-responsive instrument 38 which is sensitive to the pressure in the chamber 28 through a line 40 and actuates a hydraulic ram or motor 42 to move the blades of the damper 10 accordingly. If the pressure in the chamber 28 should drop because of a larger outflow of air, the damper 10 will then open to enable more air to flow into the chamber 28 from the fan 32. Similarly, if pressure in the chamber 28 rises because of a decrease in the flow of air therefrom, the damper 10 is moved toward a closed position to restrict the flow of air into the chamber 28.

The damper 10 is shown in more detail in FIG. 3. Here the damper 10 is located in duct 44 and includes a plurality of movable blades 46 and a plurality of stationary vanes 48 and 50. In this instance, the vanes 48 for the lower two blades 46 are horizontal while the vane 50 for the upper blade 46 is vertical. The vanes 48 and 50 need not be at any particular angle with respect to the blades 46 except that they should not be parallel. In this instance, the blades have guide projections or rollers 52 extending outwardly from the side edges thereof with the projections 52 extending into side guide grooves 54 which can be formed directly in the side walls of the duct 44 or can be in the form of U-shaped strips affixed to the side wall, for example. The projections 52 and the guide grooves 54 thereby limit movement of the blade 46 to a lineal path which is parallel to at least one of the adjacent vanes 48 so that an opening will result between the blade 46 and only one of the adjacent vanes 48. Closer control over the open area is thereby achieved with only one opening resulting for each blade. In this instance, the blade path also is parallel to the longitudinal extent of the duct 44.

In the present illustration, with the dimensions and angles shown, the width of the open area formed between the blades and vanes will be approximately one-half the length of lineal movement of the blades from their closed positions. In other words, a lineal movement of the blades of a given length will increase the open area one-half as much. It will be understood that by placing the blades 46 at shallower angles to the horizontal, the open area can be even more closely controlled by causing a lesser change in the open area between the blades and the vanes for a longer movement of the blades. Further, since the ratio between the lineal movement and open area is a straight line function, the open area for a given position of the blades can be more easily determined and regulated.

For the purpose of making the damper 10 substantially airtight when the blades 46 are closed, seals can be located at various positions. In this instance, flexible sealing strips 56 are located at the upstream edges of the vanes 48 with the seals abutting or slightly overlapping the corresponding edges of the blades 46 when closed. Similar resilient sealing strips 58 are located on the lower surfaces of the vanes 48, at their downstream edges, to press against or contact the corresponding downstream edge portions of the blades 46 when closed. One of the sealing strips 58 is also located at the lower edge of the vertical vane 50 to seal the downsteram edge of the upper blade 46. To close the side edges of the blades 46, additional sealing strips 60 are affixed to the side walls of the duct 44 at an angle substantially equal to the angle made by the blades 46, and extending between the seals 56 and 58. These press against the side edges of the blades 46 when in their closed positions. The sealing strips 56, 58 and 60 can be made of rubber or plastic, for example, or a combination of rubber or plastic and metal. For high temperature applications, the strips can also be made of metal, such as flexible stainless steel. While the sealing strips are shown affixed to the vanes and the duct wall, they can also be affixed to the blades 46.

Numerous means can be used to achieve the lineal movement of the blades 46. As previously discussed, a motor 18 and rack and pinion arrangement 20 are shown in FIG. 1 for moving the blades of the damper 10, the rack and pinion being connected to the blades by suitable linkages. In FIG. 2, the blades of the damper 10 are moved by a pneumatic ram or motor 42 which again is connected to the blades by suitable linkages. In FIG. 3, each of the blades 46 has a metal wire 62 forming a slot at its downstream edge with a crankshaft 64 extending through all of the slots, as shown. The crankshaft 64 extends vertically through the duct, preferably near a side wall thereof, with a crank 66 located above the upper wall of the duct 44. The crank can be turned by hand or by any suitable driven device through an arc of approximately 90° to move the blades 46 from their closed positions to open positions. As shown, the crank 66 has been moved through an arc of roughly 30° with the blades 46 being opened slightly.

Referring to FIG. 4, the damper 10 with the blades 46 and the vanes 48 are similar to those of FIG. 3. In this instance, however, the blades 46 are not operated in unison but can move individually and are weighted rather than being power driven. For this purpose, each of the blades 46 is connected by a flexible line 68 to a weight 70 which is located below the bottom wall of a duct 72 can be inside the duct if size and room permits. As the air pressure upstream of the blades 46 increases, it causes the blades 46 to move toward the right or downstream so as to establish an opening with the vanes 48. The amount of pressure required to initiate movement of a blade will depend on the angle and size of the blades 46 as well as the size of the weights 70. Rather than employing the separate weights 70, the guide grooves 54 can be located at an angle to the horizontal so that the weight of the blades 46 urges them toward the closed positions, thereby eliminating the necessity of employing the separate weights. By using the individually oeprated blades, any variation in pressure and flow from the top to the bottom of the duct 72 will be compensated for, which cannot be achieved when all of the blades are operated as a unit.

From the above, it will be seen that the invention basically comprises a stationary vane and a movable blade which is located at an angle to the vane. Means are provided for moving and guiding the blade in a lineal path which path is positioned so that the open area effected by movement of the blade changes in a straight line proportion with respect to the movement of the blade, with the height of the opening, as measured by the minimum distance between the blade and the vane, being less than the amount of lineal movement.

Numerous modifications in the size and positioning of the blades and vanes and the method of moving the blades will be apparent to those skilled in the art, and it is to be understood that such modifications can be made without departing from the scope of the invention, if they are within the spirit and the tenor of the accompanying claims.

What I claim is:

1. A flow control damper for controlling flow of fluid through a duct, said damper comprising a plurality of stationary vanes parallelly spaced and extending across the duct, a plurality of movable blades extending across the duct with each blade being positioned between two of said vanes, said blades lying at angles to the associated vanes and contacting both of said vanes when in a closed position, and means for lineally moving each of said blades toward and away from its closed position along a lineal path which is parallel to at least one of said associated vanes so that said blades will remain substantially in contact with one of their associated vanes regardless of their positions in the lineal paths, the movement of said blades being sufficient to cause said blades to extend beyond edges of said vanes to provide a controlled flow passage.

2. A flow control damper for control of fluid through a passage, said damper comprising at least two stationary vanes parallely spaced in the passage and extending completely thereacross, a movable blade between said vanes, and located at an angle with respect to at least one of said vanes, said blade contacting both of said vanes when in a closed position to prevent flow of fluid through the passage, and means for lineally moving said blade toward and away from its closed position along a lineal path which is parallel to at least said one vane so that said blade will remain substantially in contact with said one vane regardless of its position along the lineal path, said path also being located at an angle to said blade whereby the width of an opening formed between said blade and the other vane, when the blade is open, will be less than the distance said blade is moved along the path, said path being sufficiently long to enable said blade to move beyond the edge of the other vane to provide controlled flow for said passage.

3. A damper according to claim 1 wherein said blades are individually movable, and condition-responsive means for controlling said moving means to individually move said blades in response to a predetermined condition.

4. A flow control damper for controlling flow of fluid through a duct, said damper comprising a plurality of stationary, parallel, substantially planar vanes extending across the duct, a plurality of movable blades extending across the duct with one of said blades being located between the adjacent vanes, said blades also being planar and lying at substantially common angles to said vanes, said blades contacting said vanes parallel and near to one of the edges of said vanes when in a closed position, said blades extending beyond the other edges of said vanes, said blades contacting the opposite edges of said vanes when in the closed position, and means for lineally moving each of said blades toward and away from its closed position along a lineal path which is parallel to said vanes so that said blades will continue to contact one of the associated vanes for all positions of said blades in the lineal paths with said blades moving away from the opposite edges of said vanes as said blades move in said paths away from the closed positions to provide a controlled flow of fluid in said duct.

References Cited

UNITED STATES PATENTS

| | | | |
|---|---|---|---|
| 498,121 | 5/1893 | Jones | 137—532 |
| 1,470,460 | 10/1923 | Lorraine | 251—205 X |
| 2,060,289 | 11/1936 | Downs | 137—532 X |
| 2,586,997 | 2/1952 | Schach | 137—601 |
| 2,976,884 | 3/1961 | Kurth | 137—601 X |
| 3,055,389 | 9/1962 | Brunner | 137—487 |
| 3,103,336 | 9/1963 | Danforth | 241—205 X |

WILLIAM F. O'DEA, *Primary Examiner.*

D. LAMBERT, *Assistant Examiner.*